United States Patent [19]

Matysek et al.

[11] Patent Number: 5,442,732
[45] Date of Patent: Aug. 15, 1995

[54] PRINT FOLDER APPLICATION FOR ELECTRONIC REPROGRAPHIC SYSTEMS

[75] Inventors: James F. Matysek; Michael E. Farrell, both of Fairport, N.Y.

[73] Assignee: Xerox Corporation, Stamford, Conn.

[21] Appl. No.: 988,535

[22] Filed: Dec. 10, 1992

[51] Int. Cl.⁶ ............................................. H04N 1/23
[52] U.S. Cl. .................................. 395/116; 395/112; 395/114
[58] Field of Search ..................... 395/112, 116, 117; 364/519, 521; 358/296

[56] References Cited

U.S. PATENT DOCUMENTS

| | | | |
|---|---|---|---|
| 5,003,496 | 3/1991 | Hunt, Jr. et al. | 364/521 |
| 5,047,955 | 9/1991 | Shope | 364/519 |
| 5,130,806 | 7/1992 | Reed et al. | 358/296 |
| 5,243,691 | 9/1993 | Kuwabara et al. | 395/112 |
| 5,276,780 | 1/1994 | Sugiura | 395/116 |
| 5,287,194 | 2/1994 | Lobiondo | 358/296 |

Primary Examiner—Mark R. Powell
Assistant Examiner—Steven P. Sax
Attorney, Agent, or Firm—Oliff & Berridge

[57] ABSTRACT

A print folder application that can be run on existing electronic reprographic systems. By using a print folder, users may select several jobs in the job file to be printed as a specified number of collated supersets with or without a common finishing selection. This can be accomplished without disturbing the individual jobs in the job file. Use of a print folder has the advantages of avoiding operator post-collation of sets of different jobs into supersets for distribution and the ability to get a uniform number of sets with uniform finishing characteristics of multiple jobs without editing the individual jobs.

22 Claims, 9 Drawing Sheets

PRINT FOLDER APPLICATION FOR ELECTRONIC REPROGRAPHIC SYSTEMS

BACKGROUND OF THE INVENTION

1. Field of the Invention

This invention relates to a process where an operator may select a print folder application that can be run on existing electronic reprographic systems.

2. Description of Related Art

Electronic reprographic systems, such as DocuTech, have the ability to accept jobs for printing and print individual jobs on demand. The jobs may be obtained by setting up job parameters at the User Interface (UI) and scanning in a physical set of original documents or a complete job may be sent to the printer system electronically via a local area network. Each job is defined by, among other things, a number of image pages in the job, how many prints of each image page are required (quantity selected) and a finishing selection for each collated or uncollated set of prints. The DocuTech system, for instance, has the ability to store many of these jobs in a job file. A job in the job file may be modified to change various job parameters, and individual jobs may be printed on demand. Each job in the job file is a separate entity, with no links to other jobs in the job file.

There are several realworld situations that may require some sort of link between jobs stored in an electronic reprographic system, however. The first such example is when books or manuals are being produced. In this case, different chapters of the book or sections of the manual may be created and maintained as separate documents. This may be necessary due to the need to divide the work among several people, or simply as a convenience to maintain several small documents rather than one large book. While the different chapters of the book or sections of the manual are individual documents, they are still conceptually linked together to form a single book or manual. The electronic reprographic systems of the prior art do not support this conceptual linking of individual documents.

A second example of the usefulness of job linkage is when a user wishes to print and distribute N copies of several, otherwise unrelated jobs in the system. This may occur if the user wishes to print copies of financial reports of several different departments, or copies of technical articles on a similar topic. In these cases, the individual jobs may be resident in the job file with different values for quantity selected or different finishing selections, since the jobs are otherwise unrelated. To distribute copies of these jobs, a user may want to elect a uniform finishing selection for all jobs and a uniform quantity to print without disturbing the base jobs.

Thus, without a method of logically linking jobs in the job file together, an operator who wants to create X copies of Y different sets (either for distribution or when the Y sets are chapters in a book or manual) is forced to use the following labor intensive procedure:

1) modify each required job in the job file to change the number of prints (quantity selected) to the uniform number X, and to change the finishing selection so that all Y jobs have the same finishing selection;
2) copy each of the Y jobs to the print queue (print all of the jobs); and
3) manually collate the resulting X sets of Y jobs.

Obviously, for large values of X and Y the labor costs of this method become exorbitant.

SUMMARY OF THE INVENTION

It is thus an object of the invention to obviate the foregoing drawbacks of the prior art by providing an improved print folder process, with an associated icon, that can be used in an electronic reprographic system job file to link otherwise unrelated jobs. The print folder can then be copied to the print queue to print the contents of the folder.

These and other objects and advantages are obtained by linking jobs in a job file together for printing, where the jobs include a plurality of electronic image pages and are being processed by an electronic reprographic system, the reprographic system including a printer for producing prints from the image pages in response to job program instructions, and a user interface (UI) with display screen for inputting job program instructions for the print job in one of two approaches.

The first approach is to implicitly create a print folder by selecting a job and then selecting a copy to print folder operation in a pop-up menu at a display screen, thereby creating the folder and placing a copy of the selected job in the folder.

The second approach is to have a method of creating an empty folder in the job file. This can be achieved through a fixed, selectable print folder icon which creates a standard print folder in the job file. Once the print folder is created, any other job file may be copied or moved into it.

After creating the folder, in one of the two approaches described above, it is to be treated much the same as individual jobs are treated. As such, the operator can name a folder at creation time and modify the folder's name any time thereafter. If a name is not provided by the operator, a unique (default) name is assigned by the system. Further, when an existing folder in the job file is copied to create a new folder in the job file, the system appends a unique identifier to the copied folder name and assigns that as the name of the new folder to maintain a distinction between the two. In short, the properties of any existing folder in the job file, can be edited at any time by the operator.

To print the created print folders, the operator would select the print folder and copy or move it to the print queue by a print demand.

Although the concept of a "folder" is known in certain graphical user interfaces (GUIs) for PCs and workstations, this invention introduces the concept of a print folder to electronic reprographic systems. The essential difference between a print folder and a folder for a GUI is that the print folder conceptually links jobs for printing that are part of the conceptual document. As such, a print folder has additional properties not found in folders for GUIs. These properties include the quantity selected for printing, a finishing selection for the consolidated jobs contained in or referenced by the folder, and selections for controlling set offset between sets and supersets. Further, the print folder process described offers the option of automatic chapter starts for each job within the folder.

Other objects, advantages, and salient features of the invention will become apparent from the detailed description which, taken in conjunction with the annexed drawings, disclose the preferred embodiments of the invention.

BRIEF DESCRIPTION OF THE DRAWINGS

Referring now to the drawings which form part of this original disclosure.

DETAILED DESCRIPTION OF THE PREFERRED EMBODIMENT

The process for linking print jobs in a job file together for printing, where the print jobs include a plurality of electronic image pages and are being processed by an electronic reprographic system will now be described.

For a general understanding of the invention, reference is made to the drawings. In the drawings, like reference numerals have been used throughout to designate identical elements.

Figure 1:
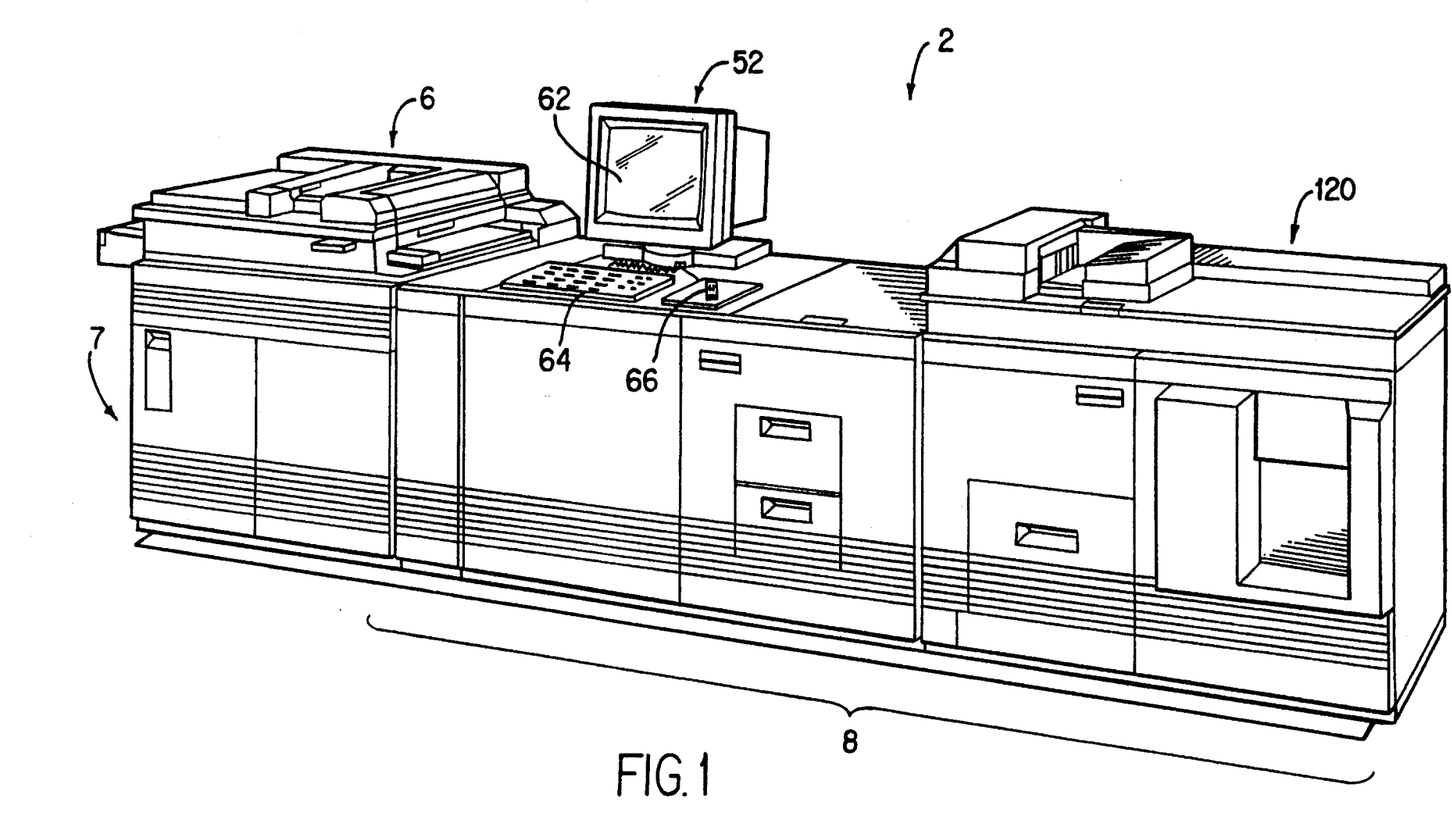
FIG. 1 is a view depicting an electronic reprographic system.
Figure 2:
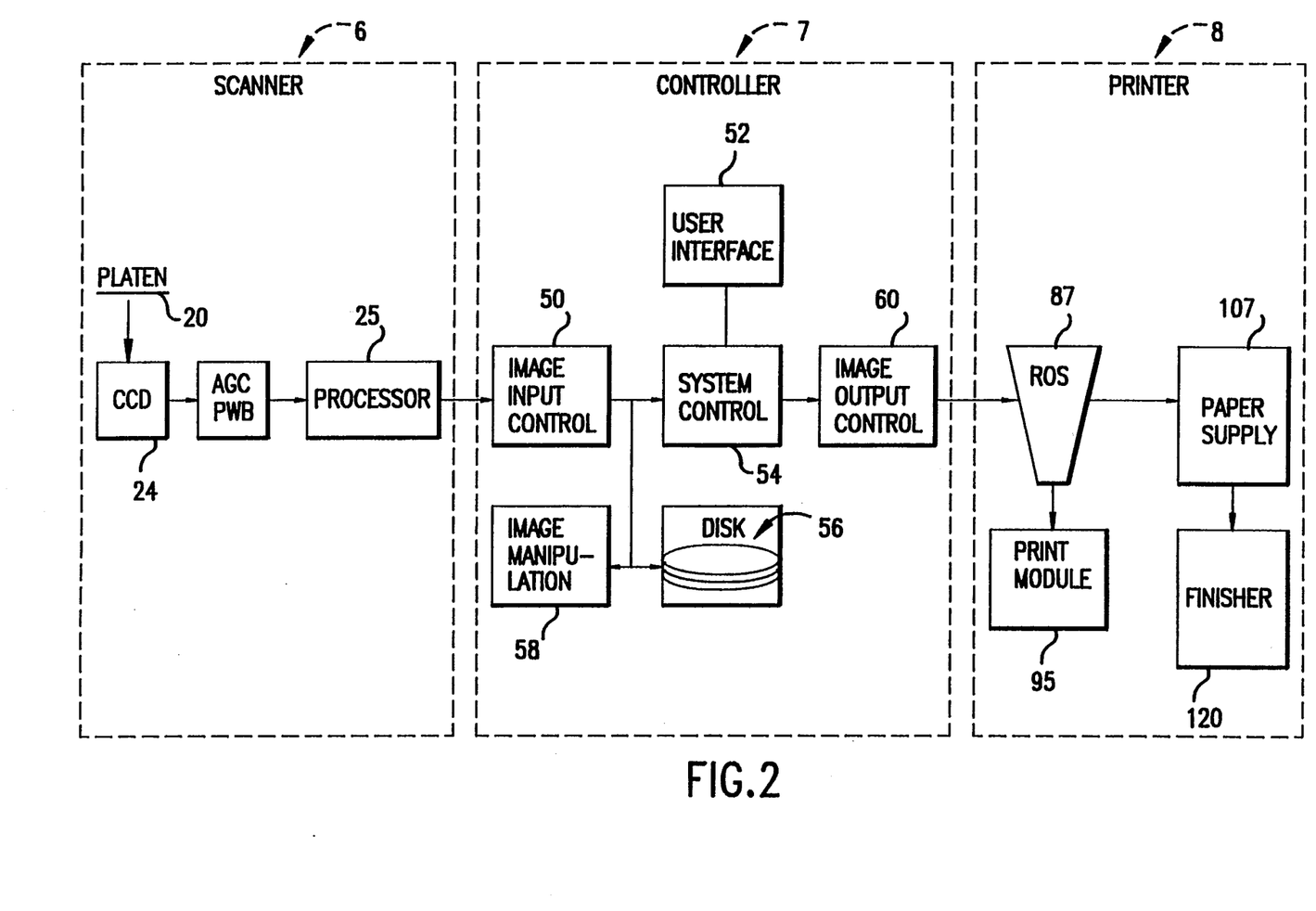
FIG. 2 is a block diagram depicting the imager elements of the reprographic system shown in FIG. 1.

Turning now to FIGS. 1 and 2, there is shown an exemplary electronic reprographic system 2 for processing print jobs in accordance with the teachings of the present invention. Reprographic system 2, for purposes of explanation, is divided into a scanner section 6, controller section 7, and printer section 8. While the invention is described with reference to a specific reprographic system, i.e., DocuTech, the invention may be used with other types of system reprographic products having similar capabilities.

Scanner section 6 (see FIGS. 2 and 3) incorporates a transparent platen 20 on which image pages 22 of the document to be scanned are located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Figure 3:
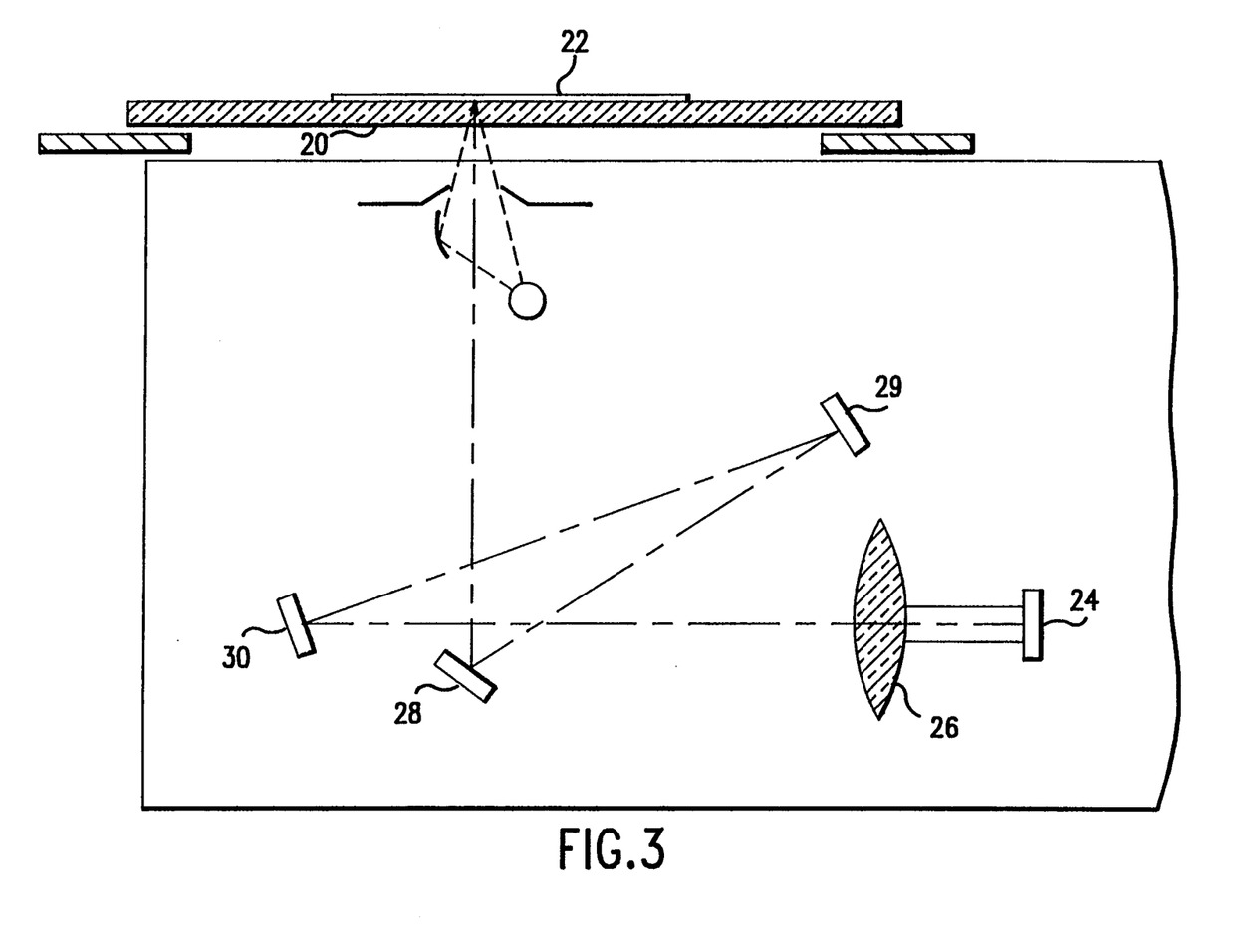
FIG. 3 is a schematic view showing certain construction details of the document scanner for the reprographic system shown in FIG. 1.

Processor 25 converts the analog image signals output by array 24 to digital image signals and processes the image signals as required to enable reprographic system 2 to store and handle the image data in the form required to carry out the job programmed. Processor 25 also provides enhancements and changes to the image signals, such as filtering, thresholding, screening, cropping, and reduction/enlarging. Following any changes and adjustments in the job program, the document must ordinarily be rescanned.

In the exemplary reprographic system 2, printer section 8 comprises a laser type printer and, for purposes of explanation, is separated into a Raster Output Scanner (ROS) section 87, print module section 95, paper supply section 107, and high speed finisher 120.

Finally, in the exemplary reprographic system 2, controller section 7 is, for explanation purposes, divided into an image input controller 50, User Interface (UI) 52, system controller 54, main memory 56, image manipulation section 58, and image output controller 60. Further, as best seen in FIG. 1, UI 52 controls a combined operator controller/CRT display consisting of an interactive touchscreen 62, keyboard 64, and mouse 66. UI 52 interfaces the operator with reprographic system 2, enabling the operator to program print jobs and other instructions (as will be detailed below) and to obtain system operating information, instructions, programming information, and diagnostic information. Items displayed on touchscreen 62, such as files and icons, are actuated by either touching the displayed item on screen 62 with a finger or by using mouse 66 to point a cursor to the item selected and keying the mouse 66.

When the image data of main memory 56 requires further processing or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready, and cropping are carried out. Following processing, the data may be returned to main memory 56, sent to UI 52 for display on touchscreen 62, or sent to image output controller 60.

Additional details of construction and operation of the exemplary reprographic system 2 discussed above will not be detailed herein, since such are well known in the reprographic art. What will be discussed, however, is a process for linking print jobs in a job file together for printing (see FIGS. 4a–4e and 5). Note that, for ease of presentation, the processor 25, main memory 56 and UI 52 interconnections and software controls therebetween will not be discussed in any great detail, since such is known in the art.

Referring to FIGS. 4a–4e, jobs are programmed in an interactive job program mode stored in main memory 56 and accessed using the UI 52 in which there is displayed on touchscreen 62 a job manager ticket 150 for the job being programmed. Job manager 150 displays various job file selections and is used to create the print folder (see FIG. 4a). The job includes a plurality of electronic image pages and is processed by an electronic reprographic system as described above, such that a print folder is created in one of two approaches.

The process for linking print jobs in a job file together for printing (see FIG. 5) will now be discussed beginning with Step 1, i.e., creating a print folder. The first approach, is to implicitly create a print folder using the touchscreen 62, by selecting the job file icon. Then the operator selects an existing job file (e.g., chapter 1 folder) and then selects the create print folder icon in a pop-up menu (see FIG. 4a), which creates the print folder and places a copy of the selected job file in the newly created print folder. This information is then stored in main memory 56.

Figure 4A:
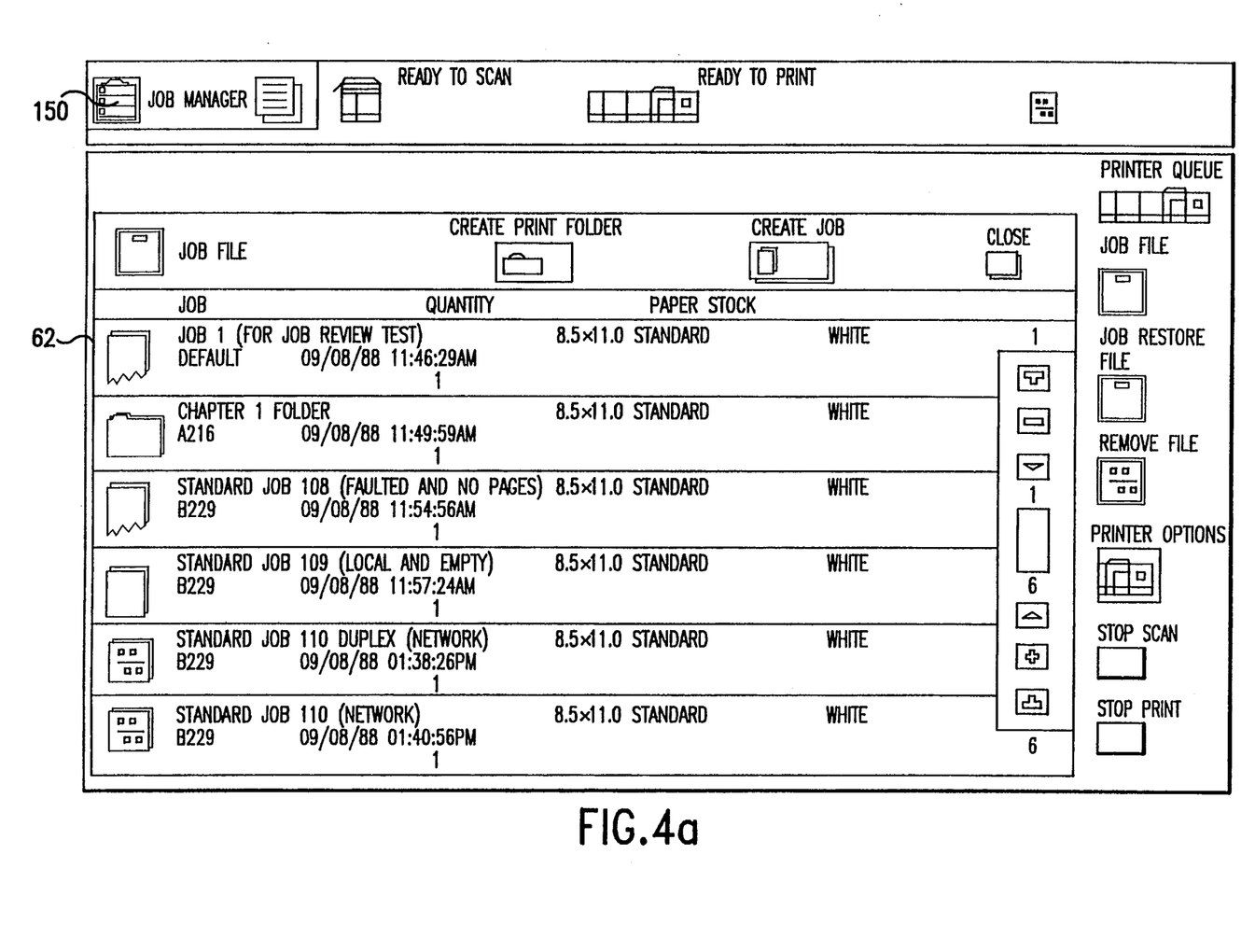
FIGS. 4a–4e are views depicting exemplary job programming tickets displayed on the UI touch screen of the reprographic system shown in FIG. 1.
Figure 4B:
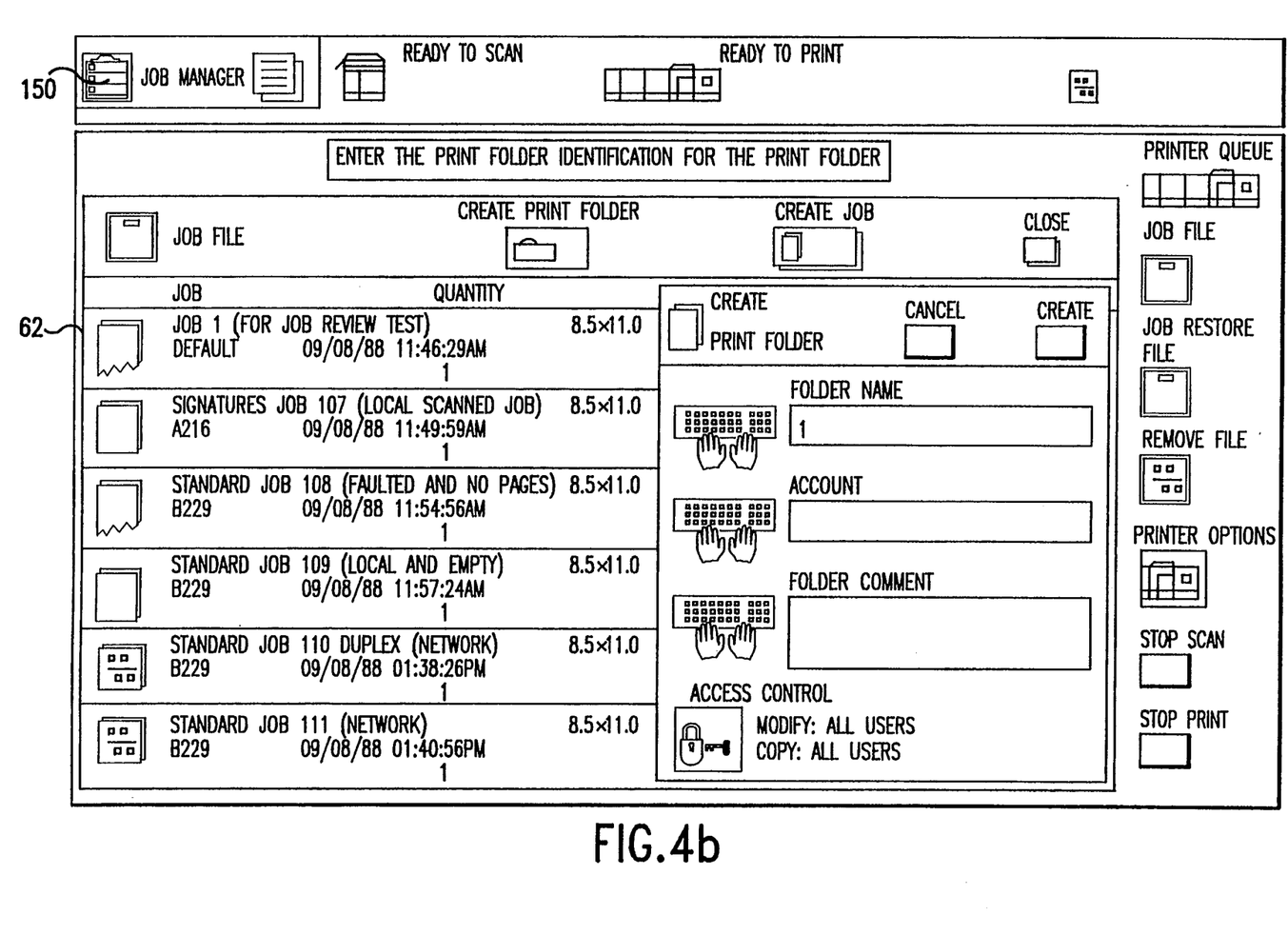
Figure 4C:
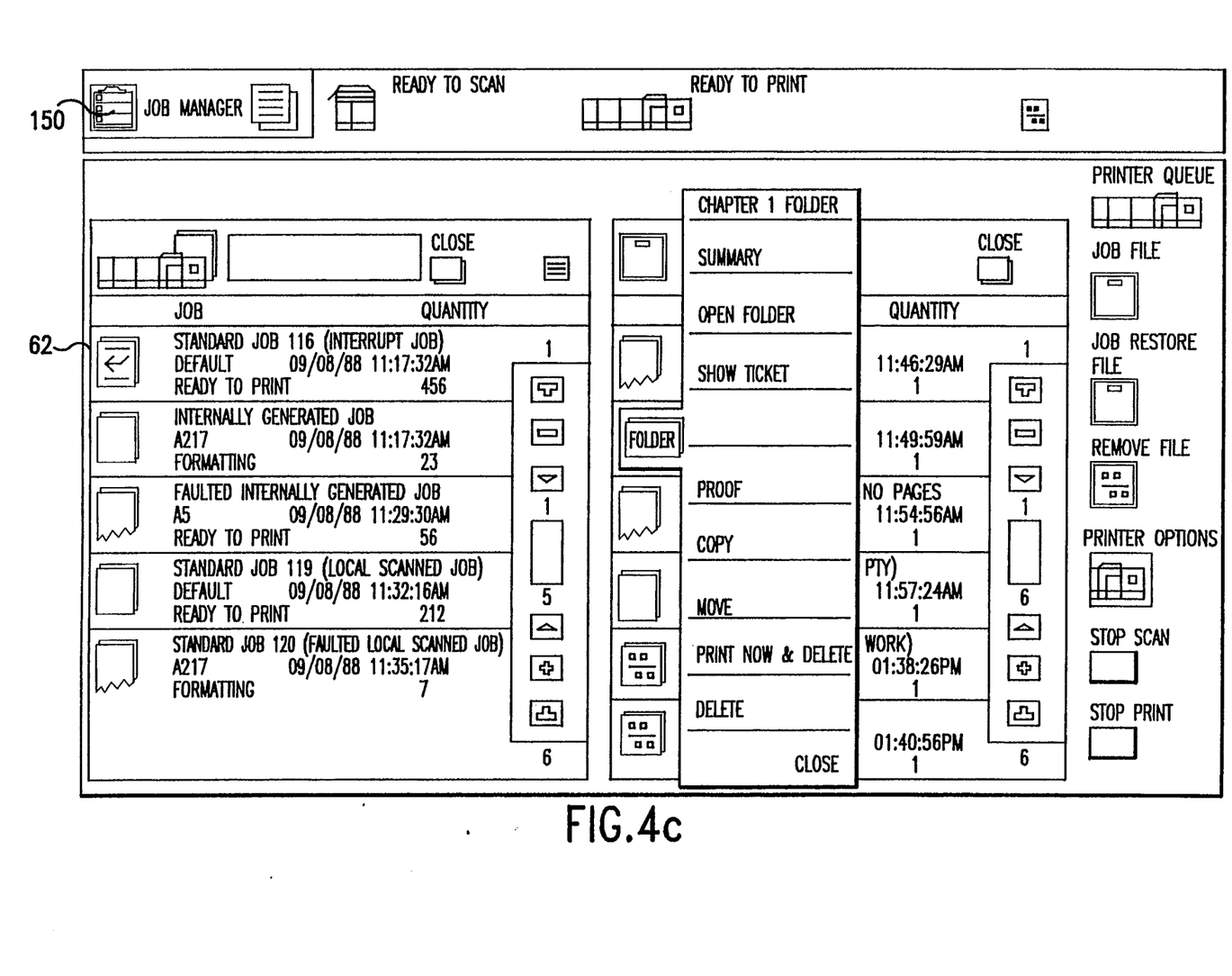

An alternative approach is to provide a method of creating an empty folder in the job file, again using a pop-up menu on the touchscreen 62 (see FIGS. 4a and 4b). This can be achieved through using the selectable create print folder icon as above, however, this time an existing job file has not been previously selected. Selecting the create print folder icon in this manner causes a menu to pop-up (FIG. 4b) which is used to create a standard print folder in the job file. Once the print folder is created and identified any of the jobs in the job file may be copied or moved into it in the manner described above. This information is then stored in main memory 56.

Using the existing copy and move operations (see FIG. 4c) resident in the control programs of representative electronic reprographic systems, jobs may be copied or moved to a print folder, or may be copied by reference into the print folder using the pop-up menu at touchscreen 62 (Step 2). The reference method of copying a job is extremely useful since it does not alter the job being referenced or create any new storage space requirements for the copy in main memory 56. Instead, an electronic reference to the existing job is created within the print folder. For example, once in the job file, a job will remain there indefinitely until it is explicitly deleted by the operator (i.e., select job file icon, highlight job file, such as chapter 1 folder, which enables pop-up menu shown in FIG. 4c, and select delete). Additionally, when a job is created using the touch screen, it is created with a job disposition (labeled "destination" in FIG. 4d). This disposition can be; save, print and delete, or print and save. Any of these options that include save will cause the job to be inserted into the job file and/or print folder as discussed above. If the disposition is print and delete, it will be submitted to the print queue only, printed once, and never saved in the job file.

As mentioned above, there are several advantages to using references to existing jobs in the job file rather than copying or moving the existing job to the print folder. For instance, a single job can be referenced in several print folders without requiring file storage space for each of the copies. Additionally, a job that is referenced in one or more print folders retains its individual identity and properties so that it can be printed separately, and a revision made to the individual job will automatically be reflected in each print folder that references that job. This is useful for the book concept where one chapter is updated, and the updated version is, thus, automatically referenced by the print folder representing the book.

Print folder properties (i.e., folder level commands that override any job level commands) must then be established based upon reprographic system capabilities (Step 3). The properties of print folders that would apply to any reprographic system incorporating them are: folder identification, print quantity, unifying instructions and finishing selections. For example, with the DocuTech system, the finishing selections available would be: unfinished, single or double stitched, or bound. Other electronic reprographic systems having different finishing selections would offer, as programmed, those available selections. In addition, such exemplary systems as the DocuTech system, would offer a touchscreen 62 or mouse 66 activated option of providing a set offset between individual jobs in the print folder and an option for a set offset between multiple copies of the entire print folder (see output icon of FIG. 4d). Finally, print folder properties could be expanded to include all job level selections, e.g., destination (print and save vs. print and delete), page numbering, output (collation, finishing, and slip sheets) and print quantity (see FIG. 4d) . Note that print folder properties (i.e., folder level commands) are accessed by selecting "show ticket" (FIG. 4c) using the touchscreen 62 or mouse 66.

To print a print folder (Step 5), the operator would select the print folder (FIG. 4c) using the touchscreen 62 or mouse 66 and copy or move it to the print queue.

Figure 4D:
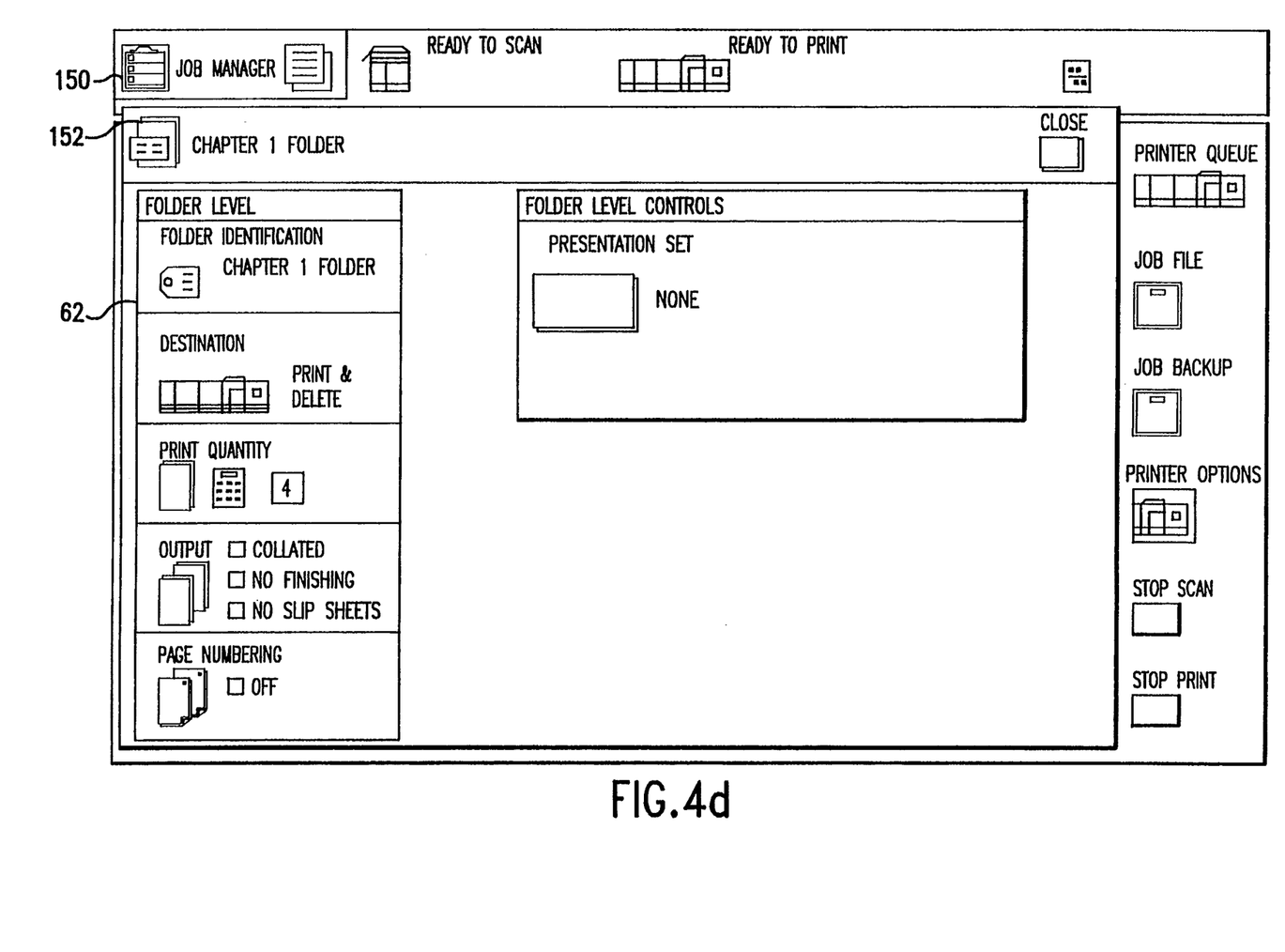
Figure 4E:
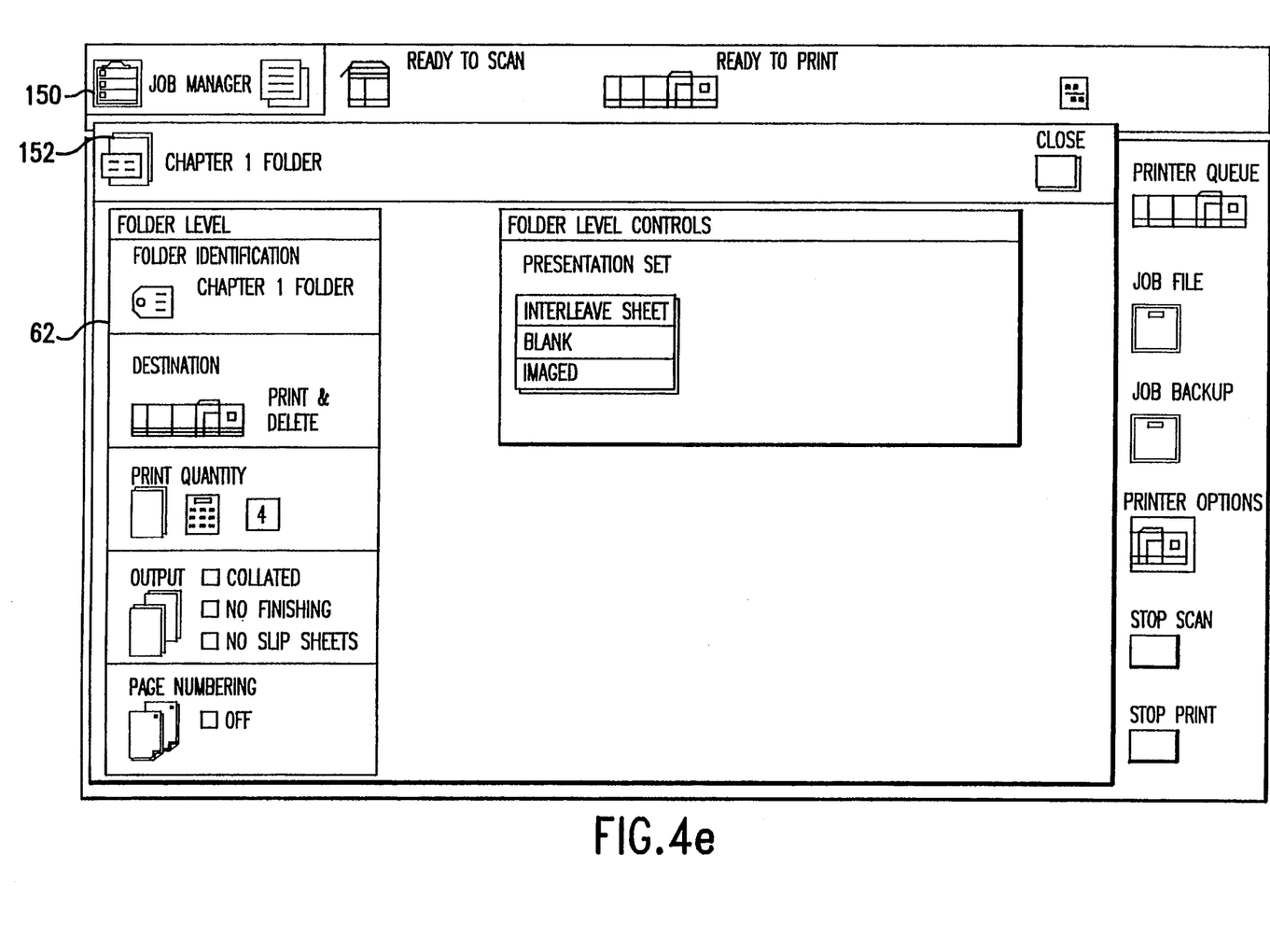
Figure 5:
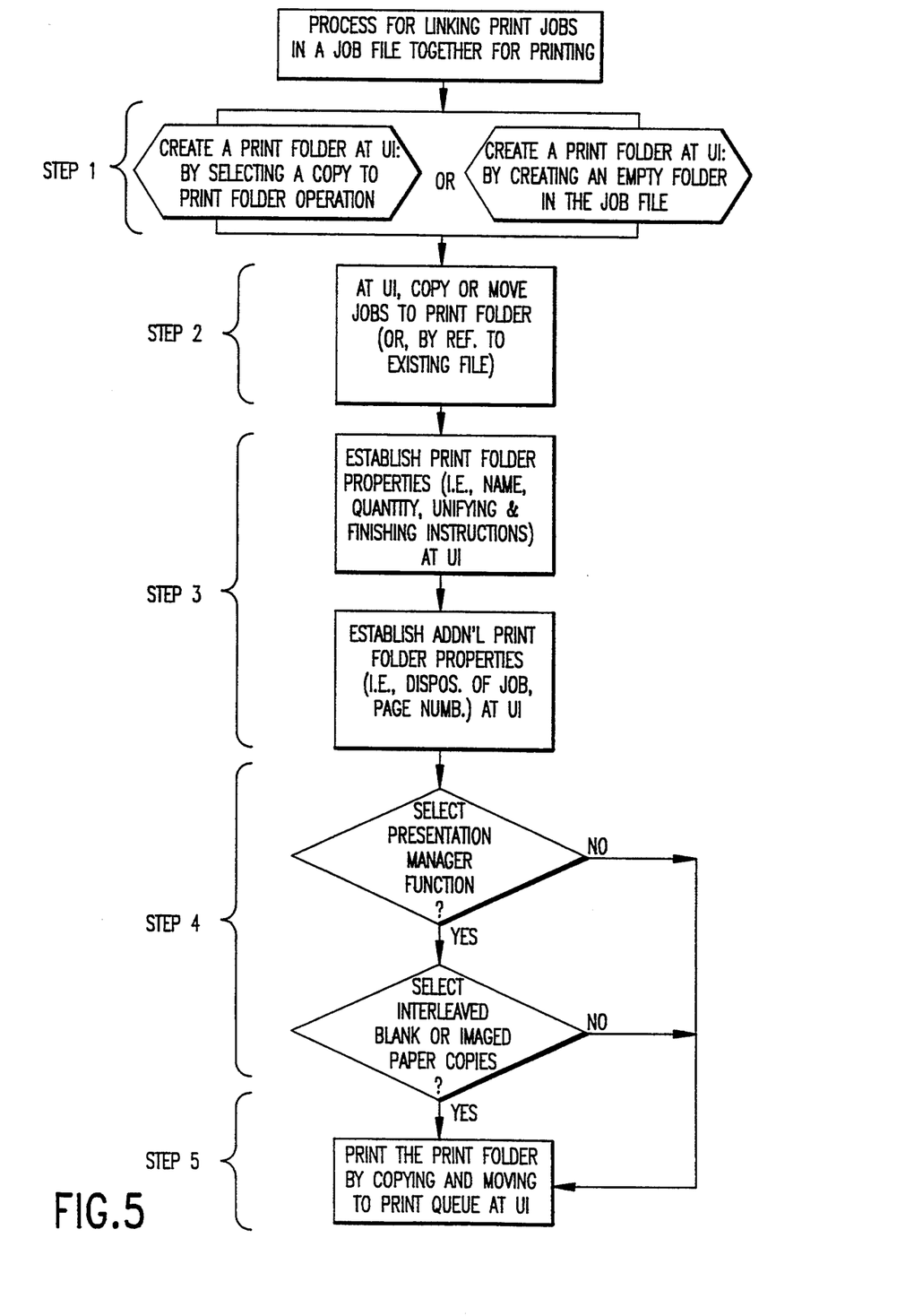
FIG. 5 is a high level flow chart of a process for linking print jobs in a job file together for printing, where the print jobs are comprised of a plurality of electronic image pages and are being processed by an electronic reprographic system according to the present invention.

As an example, for the print folder containing references to jobs named chapter 1 (exemplary chapter 1 folder 152 is shown in FIGS. 4d and 4e), chapter 2, and chapter 3, and with a quantity of four selected, the printer would print one copy of chapter 1, followed by one copy of chapter 2, followed by one copy of chapter 3. These consolidated individual jobs would be finished according to the print folder's output finishing selection (in this case; collated, no finishing and no slip sheets). The sequence would then be repeated three more times to achieve the quantity selected of four. Each of the chapters in the example may be referred to as a set, and each of the four sequences of the chapters may be referred to as a superset. The set offset selection properties of the print folder would apply at the set boundary and at the superset boundary as noted above.

Importantly, the operator is responsible for maintaining the print folder once created. For example, once a job is in the job file or print folder, only deleting (not printing) the job will remove it. There are two ways to delete a referenced job. First, the system could disallow referenced jobs from being deleted until the reference is deleted. Second, the deletion of a referenced job could be allowed by the system, but that action would cause the print folder with the now invalid reference to enter a faulted state. Should this occur, a mechanism for handling faulted print folders could be provided, which allows the print folder to be submitted to the print queue for printing, but the individual job within the print folder will not be printed and the operator is informed of the fault at the touchscreen 62. A similar mechanism could be used to inform the operator that a print folder with an invalid reference cannot be printed (i.e., the operator could be informed after the job is submitted to the print folder, or could be informed that the job cannot be submitted to the print folder when attempted). Finally, the printing of a referenced job in no way affects any of the print folders that may be referencing that job, and the printing of a folder with a reference to a job in no way affects the referenced job.

Additionally, the concept of a print folder for an electronic reprographic system may be extended to add more features to the print folder option. For instance, the concept of a presentation manager function (found in several smaller copiers) can be added to the print folder option at the output icon and accessed via the touchscreen 62 or mouse 66 (Step 4). With this option (see FIGS. 4d and 4e), a single set of transparency copies for all jobs in the print folder may first be made as a presentation set (with the option of interleaving blank or imaged plain paper copies between transparencies). After the presentation set is made, N distribution sets are made with the finishing selection, where N is the quantity selected for the print folder.

While the invention has been described in connection with the preferred embodiments, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A process for linking existing jobs in existing job files together for printing, where said existing jobs are comprised of a plurality of electronic image pages and are being processed by an electronic reprographic system, said electronic reprographic system including a printer for producing prints from said electronic image pages in response to job program instructions, and a user interface with display screen for inputting said job program instructions for each print job, comprising the steps of:

creating a print folder as a new job file using the display screen;

assigning existing job files to the print folder;

selecting print folder properties to include reprographic functions using the display screen; and printing the print folder by selecting the print folder using the display screen and assigning the print folder to a print queue by designating the print folder for printing with the selected reprographic functions, with the printing of the print folder containing contents of the assigned existing job files not affecting separate printing of the assigned existing job files.

2. The process according to claim 1, wherein said creating step further comprises:

selecting at least one job;

selecting a copy to print folder operation using said display screen; and designating said print folder such that said print folder, with said at least one job copied thereto, may be recalled and printed using said display screen.

3. The process according to claim 1, wherein said creating step further comprises:

selecting at least one job;

copying said at least one job by reference into said print folder using said display screen; and designating said print folder such that said print folder, with said at least one job referenced thereto, may be recalled and printed using said display screen.

4. The process according to claim 3, wherein during the creating step, a single job can be referenced in a plurality of print folders without requiring file storage space within said plurality of print folders for each copy.

5. The process according to claim 4, wherein a job referenced in a plurality of print folders retains a job identity and properties so that said job can be printed separately.

6. The process according to claim 5, wherein a revision made to a job is automatically referenced to each print folder that references said job.

7. The process according to claim 1, wherein during the selecting step, said print folder properties include print folder name, print quantity, unifying instructions and finishing selection, selectable using said display screen.

8. The process according to claim 7, wherein said print folder properties further include disposition of job and page numbering selectable using said display screen.

9. The process according to claim 1, wherein during the selecting step, each job selected to be printed as part of said print folder is finished according to said print folder finishing selection.

10. The process according to claim 1, wherein during the selecting step, a presentation manager function is added to said print folder properties using said display screen, whereby a single set of transparency copies for all jobs in said print folder is first made as a presentation set and, after said presentation set is made, at least one distribution set is made with said finishing selection being selectable using said display screen.

11. The process according to claim 10, wherein said presentation set has at least one of interleaved blank paper copies and imaged plain paper copies between each transparency, said interleaving being selectable using said display screen.

12. A process for linking existing print job files together for printing, where said existing print job files are comprised of a plurality of electronic image pages and are being processed by an electronic reprographic system, said electronic reprographic system including a printer for producing prints from said electronic image pages in response to job program instructions, and a user interface with display screen for inputting said job program instructions for a print job, comprising the steps of:

creating a print folder by creating an empty folder as a new job file and assigning at least one existing print job file by at least one of referencing and copying into the print folder using the display screen;

selecting print folder properties to include reprographic functions using the display screen;

assigning the print folder to a print queue by designating the print folder for printing with the selected reprographic functions; and printing the print folder by selecting the print folder using the display screen, wherein printing the print folder containing contents of the assigned existing print jobs is effected without affecting separate programmed printing of the print jobs assigned to the print folder.

13. The process according to claim 12, wherein during the creating step, a single job can be referenced in a plurality of print folders without requiring file storage space within said plurality of print folders for each copy.

14. The process according to claim 13, wherein a job referenced in a plurality of print folders retains a job file identity and properties so that said job can be printed separately.

15. The process according to claim 14, wherein a revision made to a job is automatically referenced to each print folder that references said job file.

16. The process according to claim 12, wherein during the selecting step, said print folder properties include print folder name, print quantity, unifying instructions and finishing selection selectable using said display screen.

17. The process according to claim 12, wherein during the selecting step, said print folder properties further include disposition of job and page numbering selectable using said display screen.

18. The process according to claim 12, wherein during the selecting step, each job selected to be printed as part of said print folder is finished according to said print folder finishing selection.

19. The process according to claim 12, wherein during the selecting step, a presentation manager function is added to said print folder properties using said display screen, whereby a single set of transparency copies for all jobs in said print folder is first made as a presentation set and, after said presentation set is made, at least one distribution set is made with said finishing selection being selectable using said display screen.

20. The process according to claim 19, wherein said presentation set has at least one of interleaved blank paper copies and imaged plain paper copies between each transparency, said interleaving being selectable using said display screen.

21. The process according to claim 1, wherein the selected reprographic functions include at least one of collating, stapling, binding, stitching, and finishing.

22. The process according to claim 12, wherein the selected reprographic functions include at least one of collating, stapling, binding, stitching, and finishing.

* * * * *